United States Patent
Toyohara

[11] Patent Number: 6,111,686
[45] Date of Patent: *Aug. 29, 2000

[54] OPTICAL FIBER AMPLIFIER

[75] Inventor: Atsushi Toyohara, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/010,841

[22] Filed: Jan. 22, 1998

[30]     Foreign Application Priority Data

Jan. 23, 1997 [JP] Japan .................................. 9-010152

[51] Int. Cl.$^7$ ................................ H01S 3/094; G02B 6/26
[52] U.S. Cl. .......................... 359/341; 359/160; 359/187; 359/337; 372/6
[58] Field of Search ................................... 359/134, 160, 359/187, 194, 337, 341; 372/6

[56]            References Cited

U.S. PATENT DOCUMENTS

| | | | |
|---|---|---|---|
| 5,392,154 | 2/1995 | Cherg et al. ............................. | 359/124 |
| 5,430,572 | 7/1995 | DiGiovanni et al. .................... | 359/337 |
| 5,448,586 | 9/1995 | Shmulovich et al. ................... | 372/6 |
| 5,457,568 | 10/1995 | Jacobovitz-Veselka et al. ........ | 359/341 |
| 5,500,756 | 3/1996 | Tsushima et al. ....................... | 359/177 |
| 5,506,723 | 4/1996 | Junginger ................................ | 359/134 |
| 5,561,552 | 10/1996 | Shibuya .................................. | 359/341 |
| 5,808,786 | 9/1998 | Shibuya .................................. | 359/160 |

FOREIGN PATENT DOCUMENTS

| | | |
|---|---|---|
| 0 387075 | 9/1990 | European Pat. Off. . |
| 5-90671 | 4/1993 | Japan . |
| 5-127037 | 5/1993 | Japan . |
| 67-079041 | 3/1995 | Japan . |
| 7-79041 | 3/1995 | Japan . |
| 10-75001 | 3/1998 | Japan . |

OTHER PUBLICATIONS

French Search Report, dated Aug. 20, 1999, with English language translation.
Patent abstract of Japanese Publication 05145161, dated Jun. 11, 1993.
Patent abstract of Japanese Publication 03214681, dated Sep. 19, 1991.
Paul Urquhart, IEE Proceedings, vol. 135, Pt. J, #6, pp. 385–407, Dec. 1988.
Takenaka et al, IEEE /L & B–O Society, 1991 Tech. Digest, vol. 13, pp. 254–257, Jul. 26, 1991.
Hayashi et al, Trans. Inst. Electr., Info., Commun. of Japan, vol. J76B–I, Issue 12, pp. 981–988, 1993.

*Primary Examiner*—Nelson Moskowitz
*Attorney, Agent, or Firm*—Whitham, Curtis & Whitham

[57]            ABSTRACT

An optical fiber amplifier includes an input side wavelength combiner and an output side wavelength combiner arranged at an input side and an output side, respectively. An input optical signal is supplied from a transmission line to the input side wavelength combiner, while an output signal is supplied from the output side wavelength combiner to the transmission line. Further, an optical fiber is connected between the input side wavelength combiner and the output side wavelength combiner, an optical branch circuit is connected to the input side wavelength combiner and the output wavelength combiner and, a laser device is connected to the optical branch circuit and supplies an excited laser light beam to the optical branch circuit. The optical branch circuit divides the excited laser light beam into a first laser light beam and a second laser light beam with a predetermined dividing ratio and then supplies the first and second laser light beams to the input side wavelength combiner and the output side wavelength combiner, respectively.

21 Claims, 3 Drawing Sheets

OPTICAL FIBER AMPLIFIER

BACKGROUND OF THE INVENTION

This invention relates to an optical fiber amplifier having an optical fiber.

In the general optical fiber amplifier, an optical fiber is doped with a rare earth element into a core portion. In this event, an optical signal is excited by an excitation laser having a wavelength bandwidth of 0.98 µm or 1.48 µm. Under this condition, an amplified optical signal of 1.55 µm bandwidth is obtained when an optical signal of 1.55 µm bandwidth is given.

The excitation method includes a forward excitation, a backward excitation and the bidirectional excitation. In a forward excitation, an excitation light beam is given to an input side of the optical fiber to perform the excitation in a forward direction. In the backward excitation, the excitation light beam is given to an output side of the optical fiber to perform the excitation in a backward direction. In the bidirectional excitation, excitation light beams are given to the input side and the output side to perform the excitation in both the forward and backward directions.

Generally, the forward excitation serves to reduce a noise index while the backward excitation serves to obtain a high output power. The bidirectional excitation serves to reduce the noise index and to obtain the high output power. In the practical optical fiber amplifier, the bidirectional excitation is often used to optimize both the noise index characteristic and the output power characteristic.

The conventional amplifier for the bidirectional excitation has an input side wavelength combiner and an output side wavelength combiner. The doped optical fiber is connected between the input side wavelength combiner and the output side wavelength combiner. In this event, a first excitation laser device is connected to the input side wavelength combiner while a second excitation laser device is connected to the output side wavelength combiner. With such a structure, an input optical signal is excited by an excitation laser light beam from the first excitation laser device in the input side wavelength combiner to supply the excited optical signal to the doped optical fiber. On the other hand, the optical signal from the doped optical fiber is excited by an excitation laser light beam from the second excitation laser device in the output side wavelength combiner to supply the excited optical signal as the output optical signal. Thus, the bidirectional excitation is carried out in the conventional amplifier.

However, cost and consumption of power are largely increased in the conventional amplifier because the conventional amplifier has two laser devices in the forward and backward directions.

SUMMARY OF THE INVENTION

It is therefore an object of this invention to provide an optical fiber amplifier which is capable of reducing consumption power with a simple circuit structure.

According to this invention, an input side wavelength combiner and an output side wavelength combiner are arranged at an input side and an output side, respectively. An input optical signal is supplied from a transmission line to the input side wavelength combiner while an output signal is supplied from the output side wavelength combiner to the transmission line. Further, an optical fiber is connected between the input side wavelength combiner and the output side wavelength combiner. Moreover, an optical branch circuit is connected to the input side wavelength combiner and the output wavelength combiner. In addition, a laser device is connected to the optical branch circuit and supplies an excited laser light beam to the optical branch circuit. The above optical branch circuit divides the excited laser light beam into a first laser light beam and a second laser light beam with a predetermined dividing ratio and supplies the first and second laser light beams into the input side wavelength combiner and the output side wavelength combiner, respectively.

With such a structure, the input optical signal is excited by the first laser light beam in the input side wavelength combiner to supply the excited laser light beam to the output side wavelength combiner via the optical fiber. Further, the laser light beam from the optical fiber is excited by the second laser light beam in the output side wavelength combiner to supply the excited laser light beam to the transmission line as the output signal.

In this event, the dividing ratio between the firsthand second laser light beams is determined by a noise index and an output power. Specifically, the dividing ratio of the first laser light beam is set larger than that of the second laser light beam to reduce the noise index while the dividing ratio of the second laser light beam is set larger than that of the first laser light beam to increase the output power.

The optical fiber amplifier according to this invention has only one laser device and only one optical branch circuit. With such a structure, the dividing ratio of the excitation laser light beam from the laser device can be adjusted between the forward excitation and the backward excitation by the use of the optical branch circuit. Thus, the bidirectional excitation can be realized with a simple circuit structure. As a result, both the lower cost and the lower consumption power can be achieved.

DESCRIPTION OF THE PREFERRED EMBODIMENT

Figure 1:
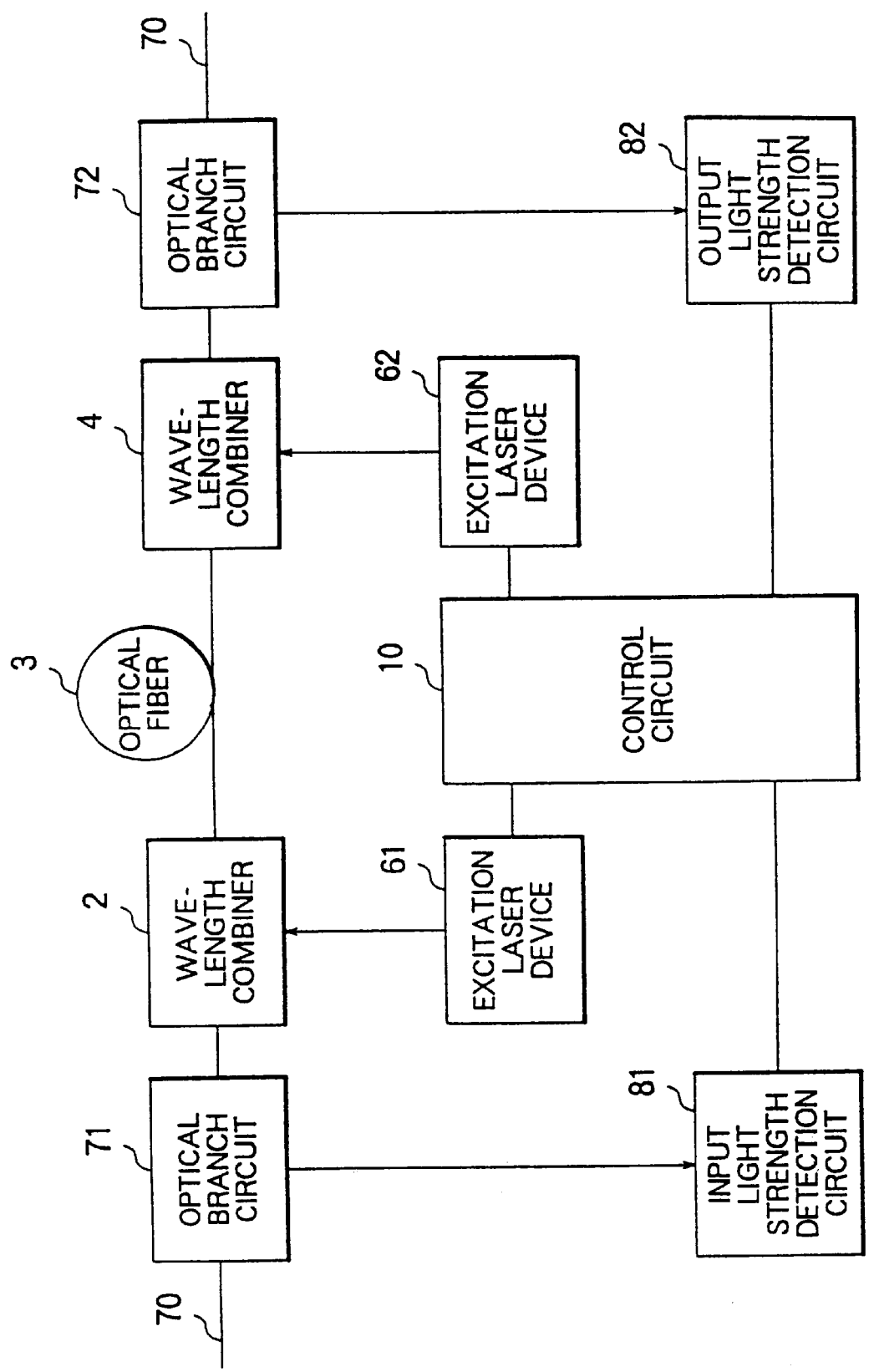
FIG. 1 is a block diagram showing the conventional optical fiber amplifier.

Referring to FIG. 1, a conventional optical fiber amplifier will first be described for a better understanding of this invention. The optical fiber amplifier is equivalent to the conventional amplifier in the preamble of the instant specification.

In the conventional amplifier, bidirectional excitation is carried out as illustrated in FIG. 1 in the manner disclosed in Japanese Patent No. 2504371. In this amplifier, an optical branch circuits 71 and 72 are arranged at an input side and an output side, respectively. Wavelength combiners 2 and 4 are connected to the optical branch circuits 71 and 72. Further, an optical fiber 3 is connected between the wavelength combiners 2 and 4. In this event, the optical fiber 3 is doped with a rare earth element. Excitation laser devices 61 and 62 are connected to the wavelength combiners 2 and 4, respectively. Moreover, an input light strength detection circuit 81 is connected to the optical branch circuit 71 while an output light strength detection circuit 82 is connected to the optical branch circuit 72. In addition, the excitation laser devices 61, 62, the input light strength detection circuit 81 and the output light strength detection circuit 82 are connected to a control circuit 10.

With such a structure, an input optical signal is supplied to the optical branch circuit 71 via a transmission line 70. The input optical signal branches into two optical signals by the optical branch circuit 71. One optical signal is given to the input light strength detection circuit 81 while the other optical signal is given to the wavelength combiner 2. The latter optical signal is excited by the excitation laser light beam from the excitation laser device 61 in the wavelength combiner 2. The excited optical signal is supplied to the wavelength combiner 4 via the optical fiber 3. The optical signal is further excited by the excitation laser light beam from the excitation laser device 62 in the wavelength combiner 4. The excited optical signal is given to the optical branch circuit 72. The optical signal branches into two optical signals by the optical branch circuit 72. One optical signal is given to the input light strength detection circuit 82 while the other optical signal is supplied to the transmission line 70 as an output signal. In this event, the control circuit 10 controls the excitation laser devices 61 and 62 based upon the detection information of the input light strength detection circuit 81 and the output light strength detection circuit 82.

The above conventional optical fiber amplifier has a high cost and a large consumption power. This is mainly because the excitation laser devices 61 and 62 are arranged in forward and backward directions. Further, temperature adjusting circuits (not shown) are required in accordance with the number of the excitation laser devices to stabilize the operation of an oscillation wavelength and an output power of the excitation laser device.

It is therefore an object of this invention to provide an optical fiber amplifier which is capable of realizing the low cost and the low consumption power.

Subsequently, referring to FIG. 2, description will be made about an optical fiber amplifier according to an embodiment of this invention.

Figure 2:
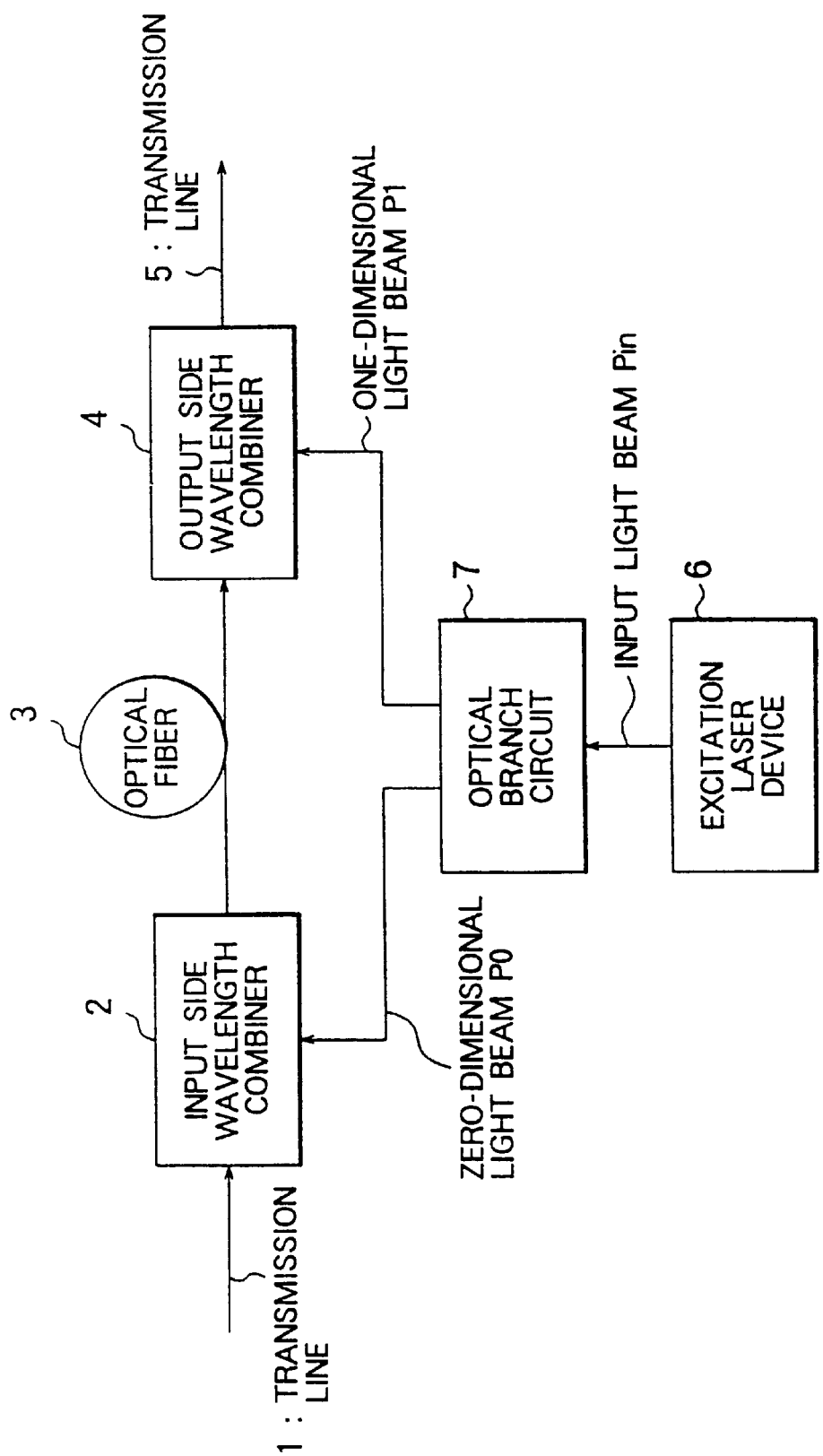
FIG. 2 is a block diagram showing an optical fiber amplifier according to an embodiment of this invention.

In the optical fiber amplifier illustrated in FIG. 2, an input side wavelength combiner 2 and an output side wavelength combiner 4 are arranged at an input side and an output side, respectively. An optical fiber 3 is connected between the input side wavelength combiner 2 and the output side wavelength combiner 4. In this event, the optical fiber is doped with a rare earth element. Further, an optical branch circuit 7 is connected to the input side wavelength combiner 2 and the output side wavelength combiner 4. Moreover, an excitation laser device 6 is connected to the optical branch circuit 7.

With such a structure, the excitation laser device 6 oscillates an excitation laser light beam. The excitation laser light beam is supplied to the optical branch circuit 7. The optical branch circuit 7 divides the excitation laser light beam into a first excitation laser light beam and a second excitation laser light beam with a predetermined dividing ratio. The first excitation laser light beam is supplied to the input side wavelength combiner 2 while the second excitation laser light beam is supplied to the output side wavelength combiner 4.

In this event, an input optical signal is supplied to the input side wavelength combiner 2 via the transmission line 1. The optical signal is excited by the first excitation laser light beam in the input side wavelength combiner 2. The excited optical signal is supplied to the output side wavelength combiner via the optical fiber 3. The optical signal is further excited by the second excitation laser light beam in the output side wavelength combiner 4. The excited optical signal is supplied to the transmission line 5 as an output signal.

In this case, the dividing ratio between the first and second excitation laser light beams is determined in accordance with a noise index and an output power. For example, the dividing ratio (output ratio) of the first excitation laser light beam is set larger than that of the second excitation laser light beam to reduce the noise index. On the other hand, the dividing ratio (output ratio) of the second excitation laser light beam is set larger than that of the first excitation laser light beam to increase the output power.

Thus, bidirectional excitation is carried out according to this invention. As illustrated in FIG. 2, the optical fiber amplifier according to the present invention has the excitation laser device 6 and the optical branch circuit 7 which are common to the input and output sides instead of the excitation laser devices 61, 62, the optical branch circuits 71, 72, the input light strength detection circuits 81 and the output light strength detection circuit 82 in the conventional optical fiber amplifier illustrated in FIG. 1. As a result, the optical amplifier according to this invention has a simple circuit structure and a low consumption power, as compared to the conventional optical fiber amplifier illustrated in FIG. 1.

In this case, an erbium (Er) doped fiber (thereinafter, referred to as an EDF) or a praseodymium (Pr) doped fiber may be used as the above optical fiber 3. Further, a semiconductor laser device or a solid state laser device may be used as the excitation laser device 6.

As mentioned above, the optical branch circuit 7 branches the excitation laser light beam from the excitation laser device 6 into the first and second excitation laser light beams and adjusts the first and second excitation laser light beams to desired levels to supply the input side wavelength combiner 2 and the output side wavelength combiner 4.

In this event, the optical branch circuit 7 includes an optical switch which utilizes an acousto-optical effect and a waveguide type optical switch which uses an electro-optical effect. A modulation frequency is matched so that diffraction efficiency is maximized at approximately a center of a wavelength spectrum of the excitation laser light beam in the optical switch which utilizes the acousto-optical effect. The diffraction efficiency can be adjusted by a modulation power P which is given to the optical switch.

In this case, when an optical power which is given to the optical switch is specified by an input light beam Pin, a power of a diffracted light beam is Especified by one-dimensional light beam P1, a power of a transmitted light beam without diffraction is specified by zero-dimensional light beam P0 and the optical switch has an insertion loss Ls, the sum of the zero-dimensional light beam P0 (P) and the one-dimensional light beam P1 (P) which are functions of the modulation power P is substantially equal to the product of the input light beam Pin and the insertion loss Ls. From the above relation, the product of the input light beam Pin and the insertion loss Ls is constant. Consequently, when the one-dimensional light beam P1 is increased, the zero-dimensional light beam is reduced.

Therefore, the power of the amplified optical signal which is outputted from the optical fiber amplifier is determined by the conversion efficiency of the EDF and the insertion loss of the wavelength synthesizer at the input and output sides. Consequently, the input light beam Pin is set to such a range and is divided into the zero-dimension light beam P0 and the one-dimension light beam P1.

Figure 3:
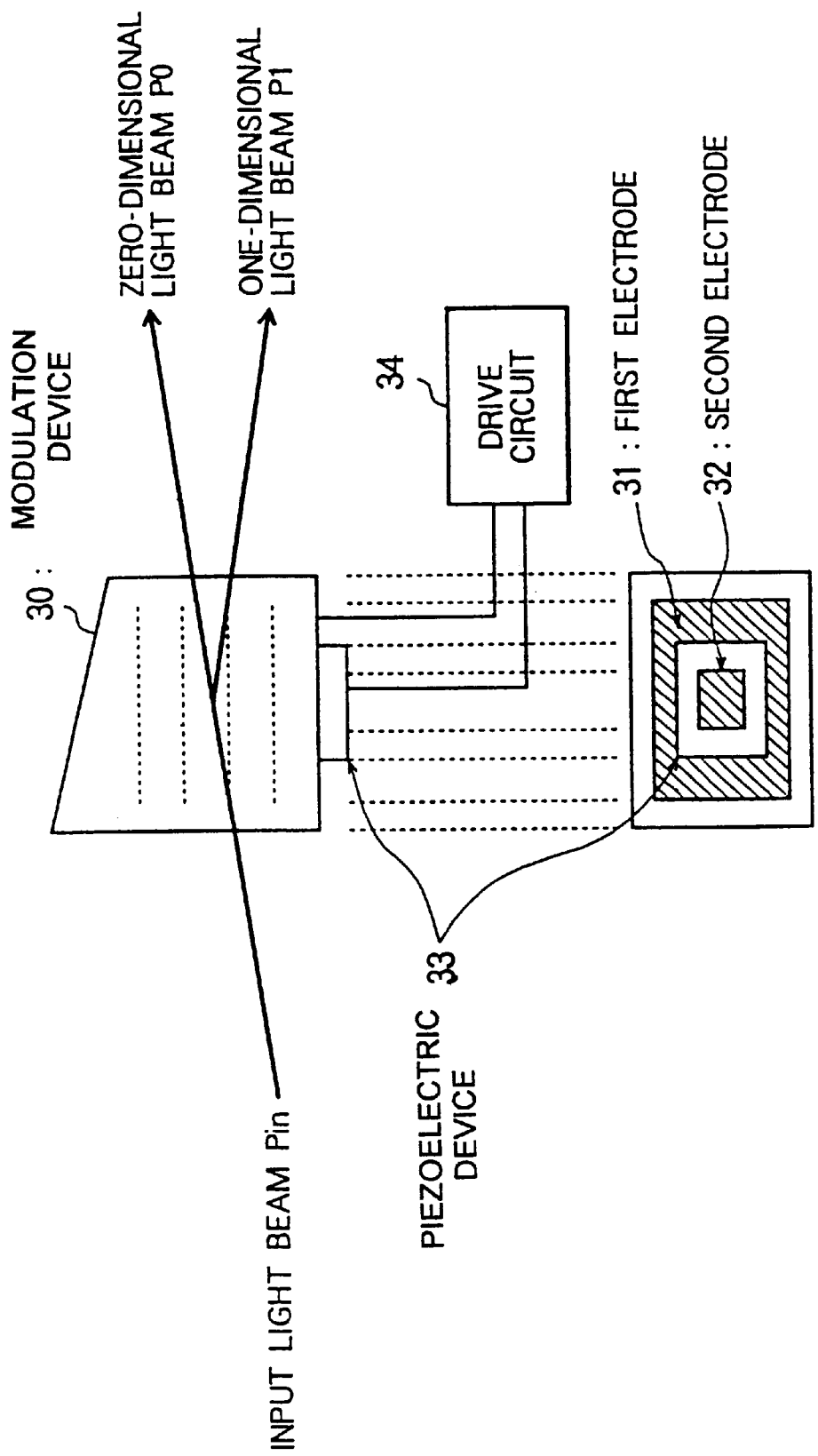
FIG. 3 shows an example of the optical branch circuit illustrated in FIG. 2.

Referring to FIG. 3, detailed description will be made about the optical switch as the optical branch circuit 7 which utilizes the acousto-optical effect.

The periodic distribution (grating) of index of refraction generates in a modulation medium 30 by propagating a supersonic wave in the modulation medium 30. The grating functions as a diffraction grating for a light beam having a predetermined wavelength. Consequently, the input light beam (Pin) is divided into the zero-dimension light beam (P0) (transmitted light beam) and the one-dimension light beam (P1) (diffracted light beam). In this event, the dividing rate between the zero-dimension light beam (P0) and the one-dimension light beam (P1) is determined by the strength of the supersonic wave.

Lead Molybdenum ($PbMoO_4$), tellurium dioxide ($TeO_2$) and arsenic selenide ($Ae_2Se_3$) are often used as the above modulation medium 30. These materials are cut out to a desired shape to form a first electrode 31 (base electrode) by the use of the vapor deposition. Further, a second electrode 32 is formed via lithium niobate ($LiNbO_3$) (piezoelectric device 33). With such a structure, a high frequency signal is applied between the first electrode 31 and the second electrode 32 via a drive circuit 34. The piezoelectric device 33 converts the applied signal into a mechanical vibration to generate the supersonic wave (longitudinal wave) in the modulation medium 30.

The modulation medium 30 has such a characteristic that the index of refraction is changed by the mechanical stress. Thereby, periodic change of the index of refraction is generated in the modulation medium 30 by the vibration of the supersonic wave which propagates in the modulation medium 30. The periodic change of the index of refraction serves as the diffraction grating for the input light beam (Pin) entered into the modulation medium 30. Consequently, the input light beam (Pin) is divided into the diffracted light beam (P1) and the transmitted light beam (P0). The output power of the diffracted light beam (P1) can be optionally adjusted in accordance with the power of the high frequency signal to be applied. The dividing rate between the zero-dimension light beam (P0) and the one-dimension light beam (P1) is determined by the power of the high frequency signal, namely the modulation power (P).

In the optical filter which utilizes the acousto-optical effect, the modulation wavelength is matched so that the diffraction efficiency becomes maximum for the wavelength which is intentionally deviated from the center wavelength of a wavelength spectrum of the excitation laser light beam to a short wavelength side or a long wavelength side. As a result, the output power having a desired wavelength is obtained from the one-dimension light beam (P1). Consequently, the wavelength can be changed between the zero-dimension light beam (P0) and the one-dimension light beam (P1). Further, in such a optical filter, the zero-dimension light beam (P0) and the one-dimension light beam (P1) can be also adjusted by the modulation power, like the above optical switch.

On the other hand, the waveguide type optical switch is formed by arranging an electrode consisting of titanium, chrominum and gold on the optical waveguide. In this case, the optical waveguide is formed by thermally diffusing titanium into lithium niobate and niob oxide tantarate of the ferroelectric substance material via a buffer layer of a silicon oxide. A directional coupler type is generally used as the waveguide structure. Further, the output power can be adjusted by changing the voltage to be applied to the electrode.

Further, where the voltage which is applied to the waveguide type optical switch is V, the optical power which is given to the waveguide type optical switch is Pin, one optical power which is branched by the directional coupler portion is Po, the other optical power is P1 and the insertion loss of the optical switch is Ls, the sum of the optical power P0 (V) and the optical power P1 (V) is substantially equal to the product of the optical power Pin and the insertion loss Ls.

In the above optical switch which utilizes the acousto-optical effect, the low insertion loss can be realized and further, the polarizing dependency becomes small. On the other hand, a control circuit for controlling the voltage becomes simple in the waveguide type optical switch.

Where the optimum optical power PO and PI are determined in advance, a fiber anastomosis type optical branch coupler, or a lens system optical branch coupler having a dielectric film or a half mirror may be used as the optical branch circuit 7.

EXAMPLE

Referring to FIG. 2, description will be made about an example of the above optical fiber amplifier.

The EDF containing the erbium in the core portion is used as the optical fiber 3. The optical fiber 3 is connected between the input side wavelength combiner 2 and the output side wavelength combiner 4. The excitation laser device 7 of the semiconductor supplies the excitation laser light beam having a wavelength bandwidth of 1.48 μm into the optical branch circuit 7. In this event, the optical switch which has a molybdic acid lead as a modulation catalyst and which utilizes the acousto-optical effect is used as the optical branch circuit 7.

With such a structure, where the output of "+10 dBm" and the noise index of "7 dB" are obtained with the input optical signal of 1.550 nm having "−10 dBm", the output of the excitation laser requires about 50 mW in the conversion efficiency 50% of the EDF and the insertion loss 4 dB of the optical switch. Under this condition, goal values of the forward excitation of 20 mW and the backward excitation of 30 mW can be realized by successively changing the dividing ratio of the optical switch. According to this example, the cost is reduced at about 30% and further, the power consumption is reduced to about 50%, as compared to the conventional case.

What is claimed is:

1. An optical fiber amplifier comprising:

an input side wavelength combiner to which an input optical signal is supplied from a transmission line;

an output side wavelength combiner which supplies an output optical signal to the transmission line;

an optical fiber which is connected between said input side wavelength combiner and said output side wavelength combiner;

an optical branch circuit which is connected to said input side wavelength combiner and said output wavelength combiner; and a laser for supplying a light beam to said optical branch circuit, said laser being the only laser in said optical fiber amplifier which supplies excitation light, said optical branch circuit dividing the light beam from said laser into a first laser light beam and a second laser light beam in accordance with a dividing ratio which produces a desired noise figure and a desired output power, said optical branch circuit dividing said light beam into said first laser light beam and said second laser light beam using an acousto-optical effect, said optical branch circuit supplying the first and second laser light beams to said input side wavelength combiner and said output side wavelength combiner, wherein said optical branch circuit includes:
 a) a modulation medium through which the light beam from said laser passes;
 b) piezoelectric means for propagating a supersonic wave through said modulation medium; and
 c) a drive circuit which inputs a control signal into said piezoelectric means for causing said piezoelectric means to propagate said supersonic wave through said modulation medium at a desired strength, said supersonic wave creating a diffraction grating in said modulation medium which divides the light beam from said laser into said first laser light beam and said second laser light beam, said dividing ratio of said first laser light beam and said second laser light beam being dependent upon the strength of said supersonic wave.

2. The amplifier claimed in claim 1, wherein:
the input optical signal is excited by the first laser light beam in said input side wavelength combiner to supply the excited laser light beam to said output side wavelength combiner via the optical fiber, and
the laser light beam from the optical fiber is excited by the second laser light beam in said output side wavelength combiner to supply the excited laser light beam to the transmission line as the output signal.

3. The amplifier claimed in claim 1, wherein:
said optical branch circuit sets the dividing ratio so that a level of the first laser light beam is larger than a level of the second laser light beam to reduce the noise figure.

4. The amplifier claimed in claim 1, wherein:
said optical branch circuit sets the dividing ratio so that a level of the second laser light beam is larger than a level of the first laser light beam to increase the output power.

5. The amplifier claimed in claim 1, wherein:
the dividing ratio of said optical switch is determined by adjusting a modulation power.

6. An optical fiber amplifier, comprising:
an input side wavelength combiner to which an input optical signal is supplied from a transmission line;
an output side wavelength combiner which supplies an output optical signal to the transmission line;
an optical fiber which is connected between said input side wavelength combiner and said output side wavelength combiner;
an optical branch circuit which is connected to said input side wavelength combiner and said output wavelength combiner; and
a laser for supplying a light beam to said optical branch circuit, said laser being the only laser in said optical fiber amplifier which supplies excitation light,
said optical branch circuit dividing the light beam from said laser into a first laser light beam and a second laser light beam in accordance with a dividing ratio which produces a desired noise figure and a desired output power, said optical branch circuit including an optical switch which is of a waveguide type having at least an electrode and which utilizes an electro-optical effect to perform said division, said optical branch circuit supplying the first and second laser light beams to said input side wavelength combiner and said output side wavelength combiner, wherein said optical switch includes:
 a) an optical waveguide; and
 b) an electrode formed on the optical waveguide, said electrode being made from titanium, chromium, and gold, the dividing ratio of said optical switch being determined be adjusting a voltage applied to the electrode.

7. An optical fiber amplifier comprising:
an input side wavelength combiner to which an input optical signal is supplied from a transmission line;
an output side wavelength combiner which supplies an output optical signal to the transmission line;
an optical fiber which is connected between said input side wavelength combiner and said output side wavelength combiner;
an optical branch circuit which is connected to said input side wavelength combiner and said output wavelength combiner; and
a laser for supplying a light beam to said optical branch circuit, said laser being the only laser in said optical fiber amplifier which supplies excitation light,
said optical branch circuit dividing the light beam from said laser into a first laser light beam and a second laser light beam in accordance with a dividing ratio which produces a desired noise figure and a desired output power, said optical branch circuit dividing said light beam into said first laser light beam and said second laser light beam using an acousto-optical effect, said optical branch circuit supplying the first and second laser light beams to said input side wavelength combiner and said output side wavelength combiner.

8. The amplifier claimed in claim 1, wherein:
said laser device comprises a semiconductor laser device.

9. The amplifier claimed in claim 1, wherein:
said laser device comprises a solid state laser device.

10. The amplifier claimed in claim 1, wherein:
said optical fiber is doped a rare earth element.

11. The amplifier claimed in claim 10, wherein:
said optical fiber is doped an erbium.

12. The amplifier claimed in claim 10, wherein:
said optical fiber is doped a praseodymium.

13. A method for amplifying an optical signal, said optical signal transmitted through an optical fiber disposed between first and second combiners,
supplying an excited laser beam;
setting a dividing ratio of a beam divider;
passing said excited beam through said beam divider to produce first and second beams having levels determined in accordance with said dividing ratio, said beam divider dividing said excited beam based on one of an acousto-optical effect and an electro-optical effect;
combining the first beam with said optical signal in said first combiner to produce a first combined signal;
passing said first combined signal through said optical fiber;
combining the second beam with said first combined signal in said second combiner,
wherein said setting step includes setting said dividing ratio so as to produce a desired noise index and a desired output power of said amplifier,
said method further including:
 passing the light beam from said laser through a modulation medium;
 propagating a supersonic wave through said modulation medium while said light beam passes through said medium, said supersonic wave creating a diffraction grating in said modulation medium which divides the light beam from said laser into said first laser light beam and said second laser light beam, said dividing ratio of said first laser light beam and said second laser light beam being dependent upon a strength of said supersonic wave.

14. The method claimed in claims 13, wherein said setting step includes successively setting said dividing ratio to produce different desired noise figures and desired output powers of said amplifier.

15. The method claimed in claim 13, wherein said passing step includes:

generating a diffraction grating which divides said excited laser beam in accordance with said dividing ratio.

16. The method claimed in claim 13, wherein generation of said diffraction grating in accordance with said acousto-optical effect includes passing a high frequency signal between two electrodes formed in an optical medium.

17. The method claimed in claim 16, wherein said setting step includes setting said dividing ratio by adjusting a diffraction efficiency of said diffraction grating.

18. The method claimed in claim 16, wherein said setting step includes setting said dividing ratio by adjusting a modulation power of said high frequency signal.

19. The method claimed in claim 13, further comprising:

passing the light beam from said laser through a modulation medium;

propagating a supersonic wave through said modulation medium while said light beam passes through said medium, said supersonic wave creating a diffraction grating in said modulation medium which divides the light beam from said laser into said first laser light beam and said second laser light beam, said dividing ratio of said first laser light beam and said second laser light beam being dependent upon a strength of said supersonic wave.

20. The amplifier claimed in claims 1, further comprising:

a first electrode;

a second electrode, said piezoelectric element disposed between said first electrode and said second electrode, wherein said drive circuit inputs the control signal into said first electrode and said second electrode, said piezoelectric element converting said signal into said supersonic wave which creates said diffraction grating.

21. The amplifier claimed in claim 20, wherein said first electrode circumscribes said second electrode.

* * * * *